(12) United States Patent
Verkruijssen

(10) Patent No.: US 6,819,753 B1  
(45) Date of Patent: Nov. 16, 2004

(54) CALL BACK METHOD

(75) Inventor: Bartel Johannes Verkruijssen, Bennekom (NL)

(73) Assignee: Privacom B.V., Rotterdam (NL)

( * ) Notice: Subject to any disclaimer, the term of this patent is extended or adjusted under 35 U.S.C. 154(b) by 0 days.

(21) Appl. No.: 09/623,877

(22) PCT Filed: Mar. 10, 1999

(86) PCT No.: PCT/NL99/00133

§ 371 (c)(1),
(2), (4) Date: Apr. 2, 2001

(87) PCT Pub. No.: WO99/46944

PCT Pub. Date: Sep. 16, 1999

(30) Foreign Application Priority Data

Mar. 11, 1998 (NL) .............................. 1008563

(51) Int. Cl.$^7$ ............................................... H04M 3/42
(52) U.S. Cl. .................................. 379/210.01; 379/219
(58) Field of Search ....................... 379/114.21, 207.05, 379/207.08, 207.15, 209.01, 210.01, 216.01; 455/404.1

(56) References Cited

U.S. PATENT DOCUMENTS

| | | | | |
|---|---|---|---|---|
| 5,027,387 A | * | 6/1991 | Moll ...................... | 397/115.02 |
| 5,311,574 A | * | 5/1994 | Livanos ................. | 379/209.01 |
| 5,311,583 A | * | 5/1994 | Friedes et al. ......... | 379/210.01 |
| 5,563,931 A | | 10/1996 | Bishop et al. .......... | 455/404 |
| 5,661,790 A | * | 8/1997 | Hsu ....................... | 379/209.01 |
| 5,864,755 A | * | 1/1999 | King et al. .............. | 455/404.1 |
| 5,970,126 A | * | 10/1999 | Bowater et al. ........ | 379/114.21 |
| 5,987,112 A | * | 11/1999 | Chakravarti et al. ... | 379/209.01 |

FOREIGN PATENT DOCUMENTS

| | | |
|---|---|---|
| JP | 9154174 | 6/1997 |
| WO | WO 9201350 | 1/1992 |
| WO | WO 9622000 | 7/1996 |

* cited by examiner

Primary Examiner—Bing Q. Bui
(74) Attorney, Agent, or Firm—Young & Thompson

(57) ABSTRACT

Communication system comprising one or more exchanges and a number of terminals (telephone sets, facsimile apparatuses, etc.) which each through one of the mentioned exchanges is able to communicate with at least one of the other terminals whereby a) the user of a calling terminal calls the number of its own exchange, transmits signals indicating that the terminal has to be called back by the exchange after which the connection is cut off, b) thereafter the exchange establishes a connection with the calling terminal, c) the user of the terminal transmits the number of a desired other terminal to the exchange, d) the exchange thereafter establishes the connection with the desired terminal, whereby at least the calling terminals can be connected partly through wireless communication paths with their own exchange and to comprise a buffer in which the number of the desired other terminal can be stored, and comprise a circuit which, after said number is keyed in by the user and is stored in the said buffer, performs the above-mentioned steps a) instead of the user, waits until the exchange reports again, retrieves the number from said buffer and transmits this number instead of the user to the exchange which will perform thereafter step d).

10 Claims, 1 Drawing Sheet

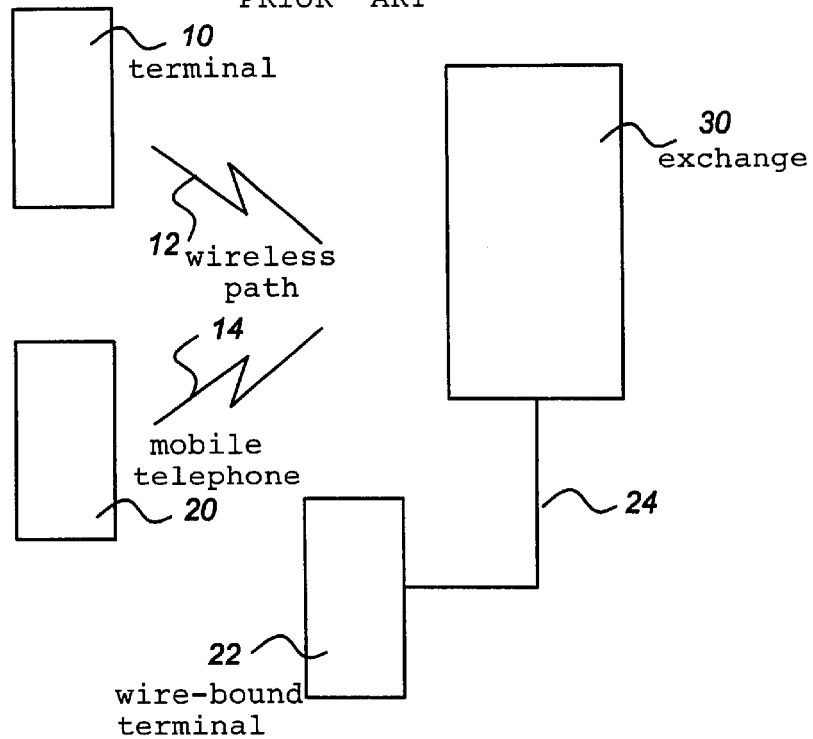
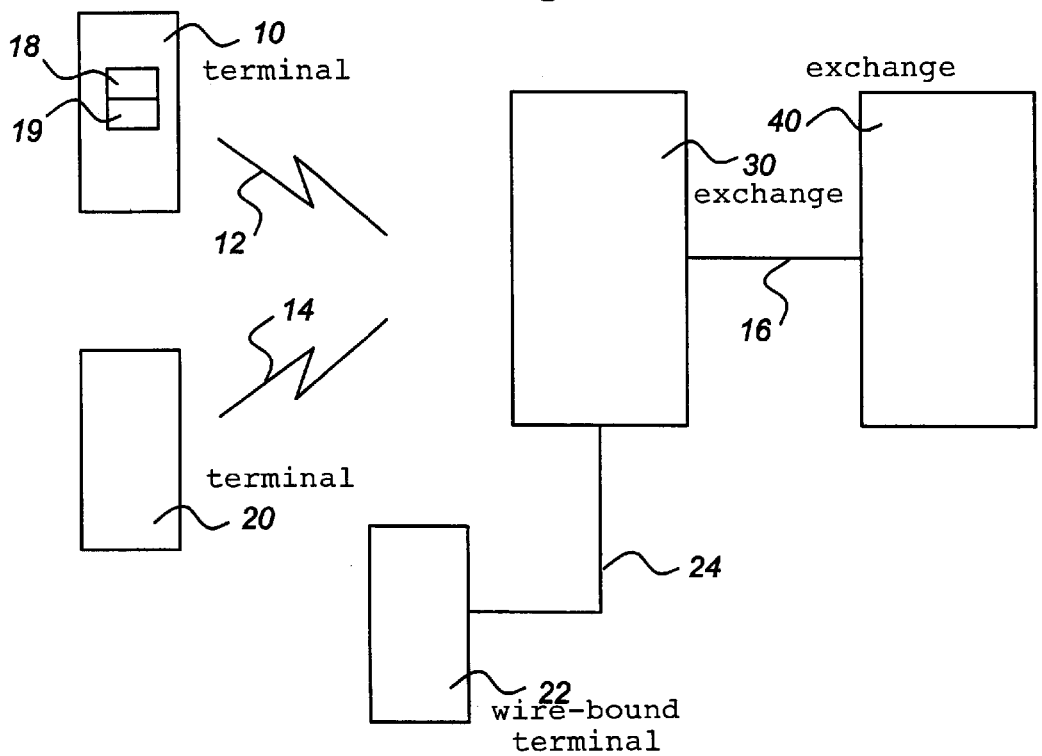

CALL BACK METHOD

FIELD OF THE INVENTION

The invention relates to a call back method in a communication system comprising one or more exchanges and a number of terminals (telephone sets, facsimile apparatuses, etc.) each of which being able to communicate through at least one of said exchanges with at least one of said other terminals, which method includes the performance of the following steps:

establishing a connection with a predetermined exchange transmitting signals to the exchange indicating the number of the calling terminal, the number of the called terminal and the fact that the calling terminal has to be called back, breaking the connection and wait for the exchange to establish the connection.

BACKGROUND OF THE INVENTION

Such a method is described in WO9201350. Various embodiments of call back methods are described in this publication. The disadvantages will be described in the following. In general these prior art methods require significant effects from the user who has to be active during at least the first two of the above-indicated steps.

Such a system, in which use is made of the so-called call back procedure, is known as such for wire-bounded communication systems. The advantage of such systems is in many cases that the communication costs of the actual communication between the calling terminal and the desired terminal are calculated on the basis of date which will become available from the exchange which was involved in establishing the connection.

In general a number of exchanges are involved into establishing a connection, certainly if we are talking about trunk or international communication traffic. In general thereby the costs will be calculated by the first exchange in the series onto which the calling terminal is connected. That can be an exchange which calculates according to a relatively high tariff.

By making use of a call back procedure any arbitrary exchange anywhere in the world which preferably calculates according to a relatively low tariff, can be used for establishing the actual connection. Although sometimes contact has to be made with the call back exchange according to a relatively high tariff for a short while the timespan of this connection is very restricted. However, in many cases during establishing the connection use will be made only of signalling of which the costs are much lower or even nil.

A practical disadvantage of such a call back procedure is that to start with the user has to call the number of the call back exchange, has to wait thereafter until the call back exchange reports back and has to key in the number of the desired terminal thereafter. This procedure is very laborious. If automatic number callers are used this will lead to practical or sometimes even insurmountable problems.

It is sometimes possible by means of a predefined number translation to order the exchange directly to call a restricted number of predefined numbers. This, however, has the disadvantages that an extra manipulation (taking up the receiver) is still necessary, the number of items is restricted and always an appeal should be made to the memory of the caller to establish the correct connection.

In the mean time automatic call back diallers are developed for terminals in wire-bounded systems by means of which the above described manipulations can be automated. For wireless connections from a mobile terminal (mobile telephone, fax, modem, etc.) no corresponding solutions are known.

OBJECT OF THE INVENTION

The purpose of the invention is now to indicate in which manner the system can be modified such that the user of a mobile terminal (among which are not comprised the terminals which in many home exchanges or company exchanges cooperate in a wireless manner with a fixed central station) is not confronted any more with the above-described laborious procedure, but, as in a wire-bounded system, only has to key in the number of the desired terminal to get a connection with said desired terminal.

SUMMARY OF THE INVENTION

In correspondence with the invention the system of the type as described in the first paragraph is characterized in that at least the calling terminals can be connected partly through wireless communication paths with their own exchange and do comprise a buffer in which the number of the desired other terminal can be stored, and comprise a circuit which, after said number is keyed in by the user and is stored in the said buffer, performs the above-mentioned step a) instead of the user, waits until the exchange reports again, retrieves the number from said buffer and transmits this number instead of the user to the exchange which will perform thereafter step d).

The added circuit according to the invention attends therefore to such a large part of the procedure that the only thing the user has to do is key in the number of the desired terminal.

According to a further development of the invention the circuit is furthermore capable to suppress the ringing signal which otherwise would sound when the connection is made by the exchange to the calling terminal.

Therewith the calling terminal acts in relation to the user as a conventional terminal and the user will not notice that a call back procedure is applied.

The invention not only relates to a whole system as above described but also relates to separate terminals. According to the invention the mobile terminal is characterized in that the terminal comprises a buffer in which the number of the desired other terminal is stored and comprises a circuit which, after said number is keyed in by the user and is stored in the buffer, establishes the connection with the exchange, reports as calling terminal, after the connection is cut off waits until the exchange has established the connection again and retrieves the number from said buffer and transmits it to the exchange.

In many of the known mobile terminals use is made of a detachable module known as the SIM module or a therewith corresponding detachable unit in which a part of the electronic circuits (amongst others destined for identification purposes) is housed. It is found that the circuit, which according to the invention has to be added to the terminal to perform the above identified functions can be housed in this SIM module. This provides the possibility to adapt existing mobile terminals in a simple manner such that they can be applied in a communication system according to the invention.

In relation to the generally higher tariffs which apply for mobile communication over a wireless network (for instance GSM, Inmarsat, etc.) a suitable choice of the "call back exchange" can lead to significant financial advantages.

BRIEF DESCRIPTION OF THE DRAWINGS

FIG. 1 illustrates a communication system according to the state of the art.

FIG. 2 illustrates a communication system in which the characterizing features according to the invention are applied.

DETAILED DESCRIPTION OF THE INVENTION

FIG. 1 illustrates a terminal 10, for instance a mobile telephone, which through a wireless communication path 12 is able to establishes a connection with a suitable exchange 30. Through said exchange 30 the terminal 10 is able to establish a connection with another terminal, for instance through the wireless path 14 with a mobile telephone 20 or through a wire-bounded network 24 with a wire-bounded terminal 22.

In case the terminal 10 for instance wants to establish a connection with the terminal 20, then the terminal 10 will transmit a signal through the wireless path 12 to the exchange 30. Thereafter the number of the desired terminal 20 will be transmitted to the exchange 30 whereafter the exchange will take care that through communication path 14 the terminal 20 is called. As soon as the terminal 20 reports back, the connection from terminal 10 to terminal 20 through the exchange 30 is established. In a similar manner the terminal 10 is able to establish a connection with the wire-bounded terminal 22.

In this prior art procedure the costs of the communication connection between the terminal 10 and the terminal 20 respectively 22 are calculated on the basis of the standards handled by the exchange 30.

FIG. 2 illustrates a configuration whereby besides the terminals 10 and 20 and the exchange 30 an other exchange 40 is involved. The terminals 10 and 20 are for instance embodied again as mobile telephones and are able to establish a connection with the exchange 30 respectively through the wireless communication path 12 and the wireless communication path 14. The wire-bounded apparatus 22 is connected to the exchange 30 through the network 24. The system comprises furthermore an other exchange 40 which through a communication path 16 is able to get into communication with the exchange 30. The communication path 16 will in general run through cables. In the communication path 16 in general one or more further exchanges will play a role, however, only for performing switch through functions and therefore these exchanges are within the scope of the invention of less relevance. It is only made clear that the exchanges 30 and 40 may have in a geographical sense a large mutual distance.

It is now assumed that the terminal 10 has no subscriber relation with the exchange 30 but has a subscriber relation with the exchange 40. However, at the moment the terminal 10 is situated within the influence area of the exchange 30. As soon as the mobile apparatus 10 indicates, by transmitting the number of the exchange 40, that he wants to make a connection with another terminal then said number will be received by the exchange 30 and will be transmitted to the exchange 40. The exchange 40 recognizes the identity of the calling terminal 10 (for instance by means of the Calling Line Identification) whereafter the further connection is prohibited or an eventual established connection is cut off through the calling terminal or through the exchange. Thereafter the exchange 40 will establish a connection with the terminal 10, receives from the terminal 10 the number of the desired subscriber such as the mobile terminal 20 or the wire-bound apparatus 22 and establishes the connection with said terminal 20 respectively the apparatus 22. Thereby it is not necessary that the same communication routes will be used. It is very well conceivable that dependent on the available free channels the final connection runs along other paths.

In this configuration according to FIG. 2 in fact the exchange 40 will provide the data on the basis of which the costs of the communication connection between the terminals 10 and 20 will be calculated. In case the exchange 40 uses a lower tariff than the exchange 30, then the subscriber 10 who has to pay for the connection has the benefit.

To perform the whole procedure such that the user of the terminal 10 is not aware of the manner in which the connection is established, it is necessary to add a buffer 18 to the terminal 10 in which buffer the number of the called subscriber 20 (or 22) is stored as well as the number of the exchange 40 is stored and furthermore an electronic circuit 19 which reacts on the return call of the exchange 40 by accepting this return call and by transmitting the number of the terminal 20 or 22 which is stored in the buffer 18. The user of the terminal 10 is not aware of this and keeps waiting until the called terminal 20 (or 22) reports itself. In fact the user of terminal 10 gets the feeling that the connection is made in the same manner as in the configuration according to FIG. 1. The essential difference, however, is that the costs of the established connection in case of the configuration of FIG. 2 can be significantly lower. The costs are dependent on the tariff according to which the calculations are made in the exchange 40.

What is claimed is:

1. A call-back system, comprising:

a first wireless terminal, and a second wireless terminal;

a first exchange in wireless contact with the first and second terminals;

a wire-bounded terminal connected to the first exchange through a wired communication network;

a second exchange in communication with the first exchange, the second exchange including a call-authorization function, using a call-back call to the first terminal, to authorize calls from the first wireless terminal to another terminal via the first exchange while bypassing the second exchange;

a buffer located within the first terminal, the buffer configured for storing the number of called terminals; and an electronic circuit within the first terminal, the electronic circuit for accepting a call-back call-authorization call originated at the second exchange, wherein, the first terminal has no subscriber relation with the first exchange and has a subscriber relation with the second exchange, with the first terminal being situated within an influence area of the first exchange, the first terminal transmits a number to make a connection with another terminal, the number is received by the first exchange and transmitted by the first exchange to the second exchange, the first terminal also storing the number in the buffer, upon receiving the number, the second exchange recognizes the first terminal and decides to authorize the connection of the first terminal to the another terminal to establish a call via the first exchange while bypassing the second exchange and makes the call-back call to the first terminal, the electronic circuit of the first terminal accepting the call-back call with the call-authorization from the second exchange and makes the connection to the another terminal via the first exchange, the first terminal making the connection using the number of the another terminal stored in the buffer.

2. The system of claim 1, wherein the second exchange makes the decision to authorize the connection of the first terminal to the another terminal, via the first exchange while bypassing the second exchange, based on a comparison of costs for the first exchange to route the call and costs for the second exchange to route the call.

3. The system of claim 1, wherein the another terminal is the second wireless terminal.

4. The system of claim 1, wherein the another terminal is the wire-bounded terminal.

5. The system of claim 1, wherein the buffer is configured to store a number of the second exchange.

6. The system of claim 1, wherein the electronic circuit is housed in a SIM module.

7. A call-back terminal, comprising:

a first wireless terminal in wireless contact with a first exchange and, via the first exchange, in communication with a second exchange, the second exchange including a call-back call-authorization function to authorize calls from the first wireless terminal to another terminal via the first exchange;

a buffer located within the first terminal and configured for storing the number of a called terminal; and an electronic circuit within the first terminal configured for accepting a call-back call-authorization from the second exchange, wherein, the first terminal has no subscriber relation with the first exchange and has a subscriber relation with the second exchange, the first terminal transmits a number to make a connection with another terminal, the number is received by the second exchange via the first exchange, the number is also stored in the buffer, upon receiving the number, the second exchange recognizes the first terminal and decides to authorize the connection of the first terminal to the another terminal to establish a call via the first exchange and makes a call-back call-authorization call to the first terminal, the electronic circuit of the first terminal accepting the call-back call-authorization from the second exchange and thereafter makes the connection to the another terminal to establish the call, the first terminal making the connection using the number of the another terminal stored in the buffer via the first exchange and bypassing the second exchange.

8. A call-back method in a communication system comprising at least one exchange and at least one terminal, the one terminal provided with a buffer circuit for storing a called terminal number, the one terminal provided with an electronic circuit for receiving a call-back call from an exchange, comprising the steps of:

a user entering into the one terminal a number to make a wireless call to another terminal, the entry of the number storing the number in the buffer;

the electronic circuit establishing a connection at least partly through wireless paths with a predetermined exchange;

the electronic circuit transmitting signals to the predetermined exchange indicating that the one terminal has to be called back;

the electronic circuit breaking the connection and waiting for the predetermined exchange to call back;

the one terminal receiving a call-back call from the predetermined exchange and, upon a call-back connection being established, retrieving the stored number from the buffer and transmitting the number to the predetermined exchange;

the predetermined exchange accepting the transmitted number from the one terminal and establishing a completed connection between the one terminal and another terminal;

upon establishing the completed connection, switching control of the terminal to the user.

9. A terminal adapted to carry out the call-back method according to claim 8, characterized in that the terminal comprises the buffer circuit and the electronic circuit.

10. Terminal according to claim 9, characterized in that the electronic circuit is housed in a SIM module.

* * * * *